United States Patent

Iwamoto

(10) Patent No.: US 8,511,223 B2
(45) Date of Patent: Aug. 20, 2013

(54) PROCESSING MACHINE FOR SOYBEANS AND SOYBEAN-EMBRYOS

(76) Inventor: Yoshinori Iwamoto, Kyoto (JP)

( * ) Notice: Subject to any disclaimer, the term of this patent is extended or adjusted under 35 U.S.C. 154(b) by 650 days.

(21) Appl. No.: 12/678,445

(22) PCT Filed: Sep. 19, 2008

(86) PCT No.: PCT/JP2008/002601
§ 371 (c)(1),
(2), (4) Date: Mar. 16, 2010

(87) PCT Pub. No.: WO2009/037860
PCT Pub. Date: Mar. 26, 2009

(65) Prior Publication Data
US 2010/0206182 A1    Aug. 19, 2010

(30) Foreign Application Priority Data

Sep. 21, 2007  (JP) ................. 2007-244856
Dec. 28, 2007  (JP) ................. 2007-338435

(51) Int. Cl.
*A47J 44/00* (2006.01)
*A23N 15/00* (2006.01)
*A23N 15/10* (2006.01)

(52) U.S. Cl.
CPC ............. *A23N 15/10* (2013.01); *A23N 15/00* (2013.01); *A47J 44/00* (2013.01)
USPC ............. 99/470; 99/469; 99/477; 99/538; 426/466; 426/469; 426/482; 426/520

(58) Field of Classification Search
CPC .......... A23N 15/10; A23N 15/00; A47J 44/00
USPC .................. 99/469, 470, 477, 538; 426/466, 426/469, 482, 520
See application file for complete search history.

(56) References Cited

U.S. PATENT DOCUMENTS 1,867,541 A * 7/1932 Shellabarger ............. 426/507
2,900,256 A * 8/1959 Scott ........................ 426/453

(Continued)

FOREIGN PATENT DOCUMENTS

JP    B-49-28426    7/1974
JP    A-60-83556    5/1985

(Continued)

OTHER PUBLICATIONS

Dec. 22, 2008 Search Report issued in International Patent Application No. PCT/JP2008/002601 (with translation).

(Continued)

*Primary Examiner* — Gene Kim
*Assistant Examiner* — Alexander Niconovich
(74) *Attorney, Agent, or Firm* — Oliff & Berridge, PLC (57) ABSTRACT

A processing machine for soybeans and soybean-embryos is provided, with improved efficiency in the deodorizing and drying processes and the capability to perform a deactivating process in a stable manner. A closed container is divided into individual sections by partitions. In each section, the temperature conditions for the deodorizing and drying processes can be independently determined, so that these processes can be performed within the same closed container and yet at different temperatures. A space is provided above a screw conveyer within the closed container. A heater is wound around the closed container so that the temperature can be freely regulated.

7 Claims, 5 Drawing Sheets

(56) References Cited

U.S. PATENT DOCUMENTS

| | | | | |
|---|---|---|---|---|
| 3,220,451 | A | * | 11/1965 | Bollens al. .................... 426/482 |
| 3,250,207 | A | * | 5/1966 | Moyle et al. ..................... 99/472 |
| 3,608,470 | A | * | 9/1971 | Zabiyakin et al. .............. 99/330 |
| 3,703,861 | A | * | 11/1972 | Slack et al. ................. 99/443 R |
| 3,719,502 | A | * | 3/1973 | Keely ............................ 426/231 |
| 4,128,051 | A | * | 12/1978 | Hildebolt ........................ 99/348 |
| 4,175,486 | A | * | 11/1979 | Hildebolt et al. ............... 99/483 |
| 4,302,111 | A | * | 11/1981 | Harris ........................... 366/107 |
| 4,534,283 | A | * | 8/1985 | Nakamuta ....................... 99/468 |
| 4,922,812 | A | * | 5/1990 | Schweinfurth ................. 99/495 |
| 5,024,148 | A | * | 6/1991 | Moses ............................. 99/618 |
| 5,170,697 | A | * | 12/1992 | Kuboyama ...................... 99/470 |
| 5,245,918 | A | * | 9/1993 | Volk, Sr. ......................... 99/574 |
| 5,427,016 | A | * | 6/1995 | Dunckel .......................... 99/355 |
| 5,461,970 | A | * | 10/1995 | Edwards, Jr. .................. 99/575 |
| 5,560,287 | A | * | 10/1996 | Petelle et al. ................... 99/451 |
| 5,733,592 | A | * | 3/1998 | Wettstein et al. .............. 426/416 |
| 6,397,737 | B1 | * | 6/2002 | Eisel ................................ 99/571 |
| 6,803,065 | B1 | * | 10/2004 | Miyamori et al. ............ 426/235 |
| 7,770,827 | B2 | * | 8/2010 | Lukashevych et al. ............ 241/7 |

FOREIGN PATENT DOCUMENTS

| | | |
|---|---|---|
| JP | A-60-114159 | 6/1985 |
| JP | A-62-3753 | 1/1987 |
| JP | U-62-182135 | 11/1987 |
| JP | A-2000-102357 | 4/2001 |

OTHER PUBLICATIONS

Dec. 22, 2008 Written Opinion issued in International Patent Application No. PCT/JP2008/002601 (with translation).

* cited by examiner

PROCESSING MACHINE FOR SOYBEANS AND SOYBEAN-EMBRYOS

TECHNICAL FIELD

The present invention relates to a processing machine for deodorizing and drying soybeans and/or soybean-embryos.

BACKGROUND ART

The soybean is a highly nutritious food and in much demand as a health food or for other purposes. Therefore, soybeans are used as ingredients for various kinds of foods, such as "tofu" (bean curd), "miso" (bean paste), "shouyu" (soy sauce) and snack foods. To improve the production efficiency of such soybean-based foods, soybean powders are industrially used. Unfortunately, soybean powders inherently have an unpleasant, grassy odor, called a "soybean odor." This odor is attributable to hexanol, hexanal and other odor components produced by lipoxygenase, a fatty-acid oxidation enzyme residing in the beans. However, in recent years, soybean powders free from this soybean odor are available. Such odorless soybeans powders are produced by including a deodorizing treatment in the powder production process.

Among the nutrients contained in soybeans, isoflavone is known for its particularly high nutritious value. The demand for soybean-embryos, as well as whole soybeans, is increasing since soybean-embryos have a high isoflavone content. However, soybean-embryos also contain lipoxygenase. Therefore, as in the case of whole soybeans, a deodorizing treatment is necessary to industrially use the soybean-embryos.

One conventional method for deodorizing soybeans or soybean-embryos includes deactivating lipoxygenase with a chemical additive. Another method uses a new soybean from which lipoxygenase is genetically removed. However, out of concerns for safety and other factors, hot steam is most commonly used to deactivate lipoxygenase (refer to Patent Document 1).

A technique developed for the aforementioned conventional deodorizing treatment using hot steam employs a closed container with an internal screw conveyer; the soybeans, soybean-embryos or similar foodstuff are put into the container and deodorized by introducing hot steam into the container while conveying them with the screw conveyer (refer to Patent Documents 1 and 2). In this conventional method, a drying process using a dryer, which is typically a hot-air dryer, is carried out after the deodorizing treatment using the screw conveyer.

The conventional soybeans/soybean-embryos processing machine performing the aforementioned treatments has problems in the deodorizing process and in the subsequent drying process. In the deodorizing process, too high a treatment temperature or too long a treatment time will cause thermal denaturation or elution of proteins or other nutrients contained in the soybeans/soybean-embryos, while too low a temperature will lead to inadequate deodorization. Thus, proper control of the temperature and time is particularly important in the deodorizing process. Unfortunately, in the aforementioned method using the screw conveyer, the temperature in the closed container easily changes, which makes the treatment conditions unstable and thereby causes the finally obtained soybean powder to be inconsistent in quality. Another drawback of the conventional method is that the method requires separate systems for the deodorizing and drying processes; this configuration makes the production process complex, increases the production cost and elongates the processing time.

Still another problem of the deodorizing process is its poor drying efficiency: In the deodorizing process, the moisture content rises to a range from 10 to 18% since steam is used to deactivate and sterilize the soybeans. By contrast, to crush the soybeans into fine powder, it is necessary to lower their moisture content to a range of 7 to 8%. Drying the soybeans to such a low level after the aforementioned deodorizing treatment requires a considerable length of time; the drying time can be as long as 20 hours.

Patent Document 1: Japanese Unexamined Patent Application Publication No. S60-083556
Patent Document 2: Japanese Unexamined Patent Application Publication No. S60-114159
Patent Document 3: Japanese Unexamined Patent Application Publication No. S62-003753

DISCLOSURE OF THE INVENTION

Problem to be Solved by the Invention

The problem to be solved by the present invention is to provide a processing machine for soybeans and soybean-embryos in which the deodorizing and drying processes are efficiently performed and the deactivating treatment is achieved in a stable manner at a constant temperature within the closed container.

The present invention is also aimed at providing a technique for effectively drying soybeans in a short period of time to achieve high levels of efficiency in the process of drying the soybeans by a dryer after deactivating and sterilizing them with steam.

Means for Solving the Problems

A first aspect of the preset invention aimed at solving the previously described problems is a processing machine for deactivating soybeans, soybean-embryos and/or similar foodstuff by supplying steam into a closed container while conveying the soybeans, soybean-embryos or similar foodstuff with a screw conveyor within the closed container, which is characterized in that a space is provided above the screw conveyer.

The aforementioned space may be separated by a partition or partitions into two or more sections arranged along the axis of the screw conveyer. The pitch of the screw conveyer in one section may be different from the pitch in another section. The machine may further include a heater for heating the closed container and a controller for controlling the heater.

A second aspect of the present invention aimed at solving the previously described problems is a processing machine for soybeans and soybean-embryos, in which a tank is combined with a deactivating and sterilizing apparatus, and soybeans are stored in the tank after they are deactivated and sterilized. An impact plate is provided under the tank. The soybeans are powerfully discharged from the tank onto this impact plate. Consequently, the soybeans are cracked. Then, the cracked soybeans are dried with a dryer.

In one preferable embodiment of the present invention, a first valve, a second valve and an internal pressure increasing means are used as a soybeans-discharging means; the first valve is located between the deactivating and sterilizing apparatus and the tank; and the second valve is located between the tank and the impact plate. The internal pressure increasing means is connected to the tank. After soybeans are stored in the tank, the first valve is closed so that the pressure inside the tank is increased by the internal pressure increasing means. Subsequently, the second valve is opened, whereupon the soybeans are powerfully discharged by the internal pressure.

It is preferable to inject steam into the tank to increase the internal pressure of the tank by the steam.

It is preferable to cool the soybeans with a cooler after the soybeans are cracked, and subsequently dry the soybeans with a drier.

After the soybeans are dried, the embryos of the soybeans are separately collected from the soybeans by an embryo separator. Then, the collected embryos are deactivated by an embryo deactivator. After the deactivating process, the embryos are crushed into powder by a crusher, and this powder is collected.

It is preferable to deactivate the embryos with steam.

After the embryos are collected, the remaining soybeans are crushed into powder by a crusher, and this powder is collected.

Effects of the Invention

The presence of the space above the screw conveyer enables a larger amount of steam to be introduced into the closed container. This effectively reduces the temperature change within the closed container.

The heater provided for the closed container also helps the reduction in the temperature change within the closed container and thereby stabilizes the process of deactivating the soybeans and soybean-embryos.

Sectioning the inner space of the closed container with a partition or partitions enables the temperature to be independently set for each section. This construction makes it possible to clearly separate the humidifying, deactivating and drying stages within a single machine, and to carry out each process under optimal conditions. Thus, each process can be efficiently performed in a sophisticated manner.

The level of the top surface of the soybeans within the closed container can be changed by appropriately selecting the pitch of the screw conveyer in each section. This enables the section-by-section regulation of the contact area between the hot steam and the soybeans per unit volume. Thus, the working efficiency is improved and the conditions of each process can be finely adjusted. Specifically, it is preferable that the pitch in the deactivating section be larger than the pitch in any other section.

In the processing machine for soybeans and soybean-embryos according to the second aspect of the present invention, when soybeans are cracked, a gap is formed between the skin and albumen of each soybean. Therefore, the soybeans can be effectively dried in the subsequent stage. This drying process requires only a short period of time and hence is highly efficient.

EXPLANATION OF NUMERALS

10 . . . Partition
11 . . . Steam Supply Pipe
12 . . . Closed Container
13 . . . Space
14 . . . Screw Conveyer
15 . . . Steaming Section
16 . . . Deactivating Section
17 . . . Drying Section
18 . . . Heater
19 . . . Heater Controller
20 . . . Supplying Rotary Valve
21 . . . Discharging Rotary Valve
31 . . . Steam Heater
32 . . . Decompression Valve
33 . . . On/Off Valve
34 . . . Central Controller
35 . . . Steam Controller
36 . . . Exhaust Valve
102 . . . Deactivating and Sterilizing Apparatus
114 . . . Tank
116 . . . Impact Plate
117 . . . First Valve
118 . . . Second Valve
120 . . . Injection Port
125 . . . Cooler
130 . . . Dryer
132 . . . Embryos Separator
135 . . . Embryos Deactivator
137, 138 . . . Crusher

BEST MODES FOR CARRYING OUT THE INVENTION

Embodiments of the processing machine for soybeans and soybean-embryos according to the present invention are hereinafter described on the basis of the attached drawings.

First Embodiment

An embodiment of the processing machine for soybeans and soybean-embryos according to the first aspect of the present invention is hereinafter described with reference to FIGS. 1 to 3. The machine of the present embodiment is used to remove the soybean odor from soybeans by steaming, deodorizing and drying the soybeans that have been separated and washed. In this embodiment, it is supposed that the soybeans processed by the present machine will be either ground and classified (in the case of soybean powder) or separated with a cyclone separator or similar device (in the case of soybean-embryos).

Figure 1:
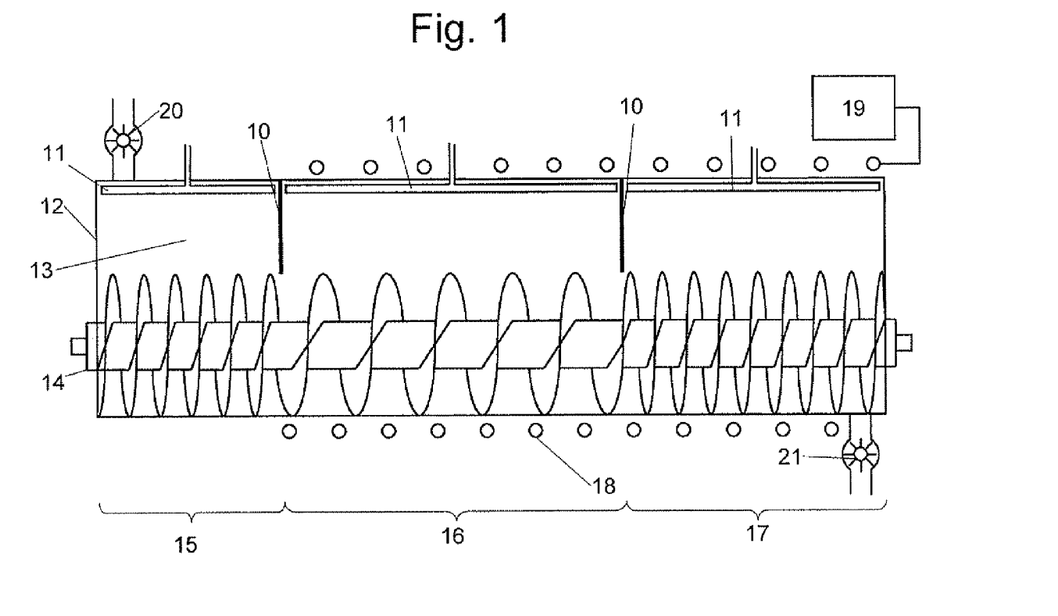
FIG. 1 is a vertical sectional view of a processing machine for soybeans and soybean-embryos according to an embodiment of the present invention.
Figure 2:
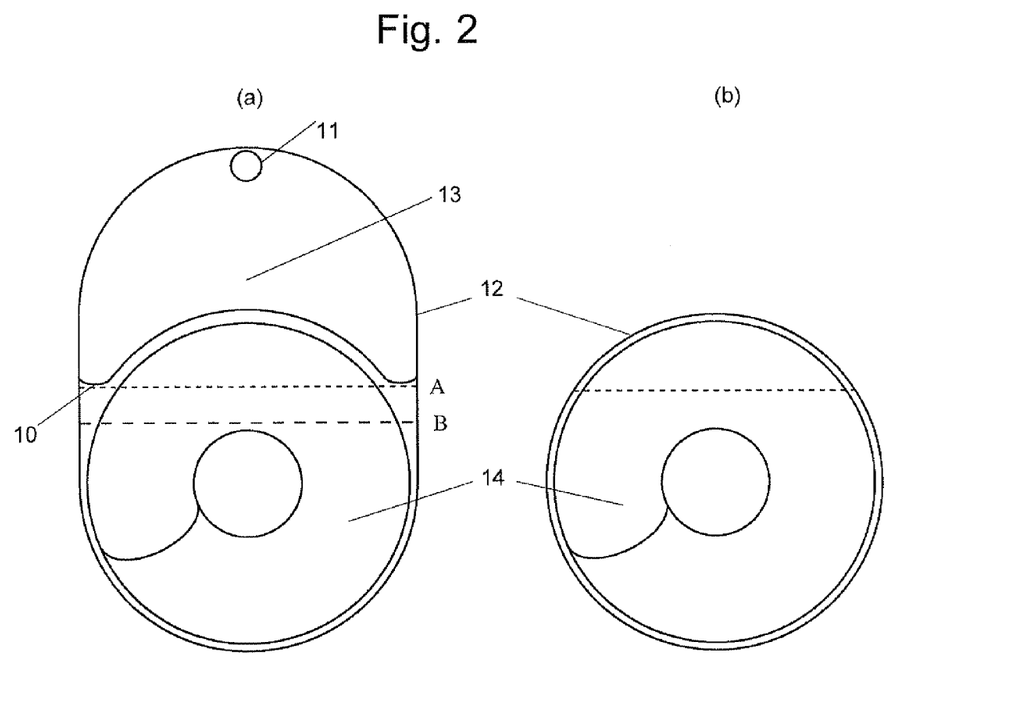
FIG. 2(a) is a cross-sectional view of the aforementioned processing machine for soybeans and soybean-embryos.
FIG. 2(b) is a cross-sectional view of a conventional soybeans deactivation machine.

FIG. 1 is a vertical sectional view of the present embodiment. Soybeans are supplied from a supplying rotary valve 20 into a closed container 12 at a rate of 800 to 1000 kg per hour and then conveyed rightwards on the drawing by a screw conveyer 14 rotating at a speed of 18 to 30 rpm. FIG. 2 compares the cross-section of the machine of the present embodiment with that of a conventional machine, where (a) is the present embodiment and (b) is the conventional machine. The screw conveyer 14 has a blade radius of 75 mm and a shaft radius of 25 mm. The clearance between the blade and the closed container 12 is 3 to 4 mm. In the present embodiment, the closed container 12 has an elliptical cross section, with a space 13 above the screw conveyer 14. Steam supply pipes 11 for introducing hot steam into the closed container 12 are provided in the space 13. Due to the presence of the space 13, the machine of the present embodiment can introduce a larger amount of steam into the closed container 12 than the conventional machine. The dotted lines in FIGS. 2(a) and 2(b) indicate the top surface of the soybeans occupying the closed container 12.

In FIG. 1, in the steaming section 15, the total length is 70 cm, the pitch of the screw conveyer 14 is 1.5 cm, and the temperature is set at 90 to 110 degrees Celsius. In the deactivating section 16, the total length is 130 cm, the pitch of the screw conveyer 14 is 3.0 cm, and the temperature is set at 140 to 170 degrees Celsius. In the drying section 17, the total length is 100 cm, the pitch of the screw conveyer 14 is 1.5 cm, and the temperature is set at 180 to 200 degrees Celsius. A heater 18 is wound around the deactivating section 16 and the drying section 17. The space 13 is separated by the partitions 10 into compartments corresponding to the aforementioned sections, and the temperature in each compartment can be independently set and maintained. The heater 18, which is set at 150 to 200 degrees Celsius, impedes the temperature drop of the closed container 12 caused by the ambient air or the soybeans being conveyed.

The soybeans supplied from the supplying rotary valve 20 into the closed container 12 are steamed in the steaming section 15 while they are being conveyed by the screw conveyer 14.

The steamed soybeans are conveyed into the deactivating section 16 by the screw conveyer 14, where lipoxygenase is deactivated by high-temperature processing. Since the pitch of the screw conveyer 14 in the deactivating section 16 is larger than in the steaming section 15, the top surface of the soybeans occupying the closed container 12 in the deactivating section 16 is lower than in the steaming section 15. The dotted line A in FIG. 2(a) indicates the top surface of the soybeans in the steaming section 15, and the dotted line B indicates the top surface of the soybeans in the deactivating section 16. Thus, a large contact area between the steam and the soybeans per unit volume is ensured, so that the deactivation is assuredly achieved. The presence of the space 13 in the deactivating section 16 enables a larger amount of steam to be introduced into the closed container 12 than in the conventional machine. The heater 18 wound around the deactivating section 16 minimizes the temperature drop of the soybeans.

The deactivated soybeans are conveyed into the drying section 17 by the screw conveyer 14 and dried. Typically, the drying process is performed so that the moisture content of the dried soybeans will be approximately 6%. The pitch of the screw conveyer 14 in the drying section is equal to the pitch in the steaming section 15, and the top surface of the soybeans occupying the closed container 12 is higher than in the deactivating section 16. Specifically, the top surface rises from level B to level A in FIG. 2. In the drying process, since the contact area between the steam and the soybeans does not need to be as large as in the deactivating process, the residence time of the soybeans per unit length of the closed container 12 is elongated to improve the production efficiency.

The dried soybeans are discharged from the discharging rotary valve 21 and sent to the subsequent process, such as the cooling and drying process.

Figure 3:
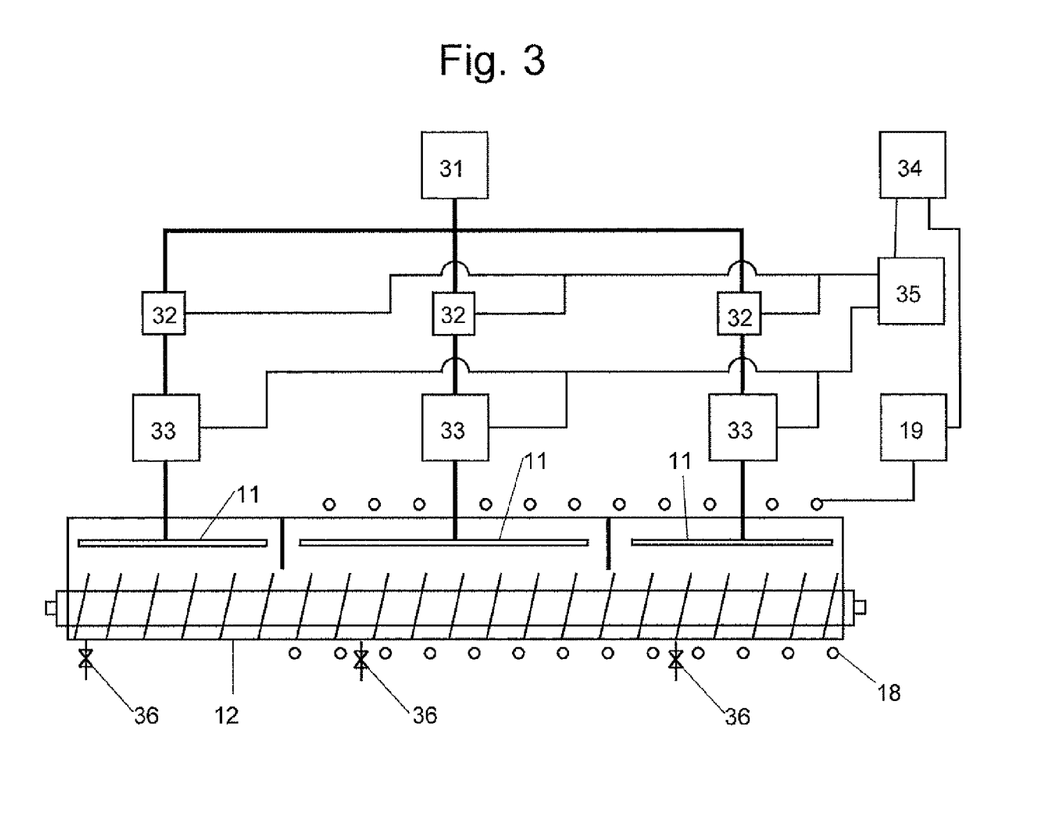
FIG. 3 is a configuration diagram of the steam-supplying and temperature-controlling system in the processing machine for soybeans and soybean-embryos according to the aforementioned embodiment.

FIG. 3 is a configuration diagram of the steam-supplying and temperature-controlling system for the closed container 12. The steam is heated to 300 to 400 degrees Celsius by a steam heater 31 and then supplied into a branch channel leading to each section. While passing through this channel, the steam is adjusted to an appropriate temperature for the section concerned. Subsequently, the hot steam is decompressed approximately to the atmospheric pressure by a decompression valve 32. The flow rate of the steam into the closed container 12 is regulated with an on/off valve 33. The steam is introduced into the closed container 12 through the steam supply pipe 11. Each pipe 11 is provided with nozzles directed downwards, by which the introduced steam is spread over the entire space of the closed container 12. Each section of the closed container 12 is equipped with an exhaust valve 36, with which the steam pressure within the closed container 12 is maintained approximately at atmospheric pressure.

The heater 18 is controlled by a heater controller 19. The decompression valve 32 and the on/off valve 33 are controlled by a steam controller 35. Both the heater controller 19 and the steam controller 35 are under the general command of the central controller 34.

It should be noted that the previous embodiment is a mere example of the present invention and can be changed in various manners within the spirit and scope of the present invention. For example:

The number of sections formed within the closed container 12 may be different from three. For example, it is possible to use more partitions 10 to create four or more sections. In this case, two or more sections can be designated as the deactivating sections for carrying out the deactivating process while raising the temperature in a stepwise manner. It is also possible to reduce the number of the partitions 10 so that only the deactivating and drying processes are carried out within the closed container 12. In this case, a steaming apparatus should be provided before the present machine.

The pitch of the screw conveyer 14 in each section may be changed so that the level of the top surface of the soybeans occupying the closed container 12 in the steaming section will be different from the pitch in the drying section.

The cross section of the closed container 12 does not need to be elliptical, as shown in FIG. 2(a). It may be a rectangle or any other shape as long as a large amount of steam can be introduced into the closed container 12.

Second Embodiment

An embodiment of the processing machine for soybeans and soybean-embryos according to the second aspect of the present invention is hereinafter described.

Figure 4:
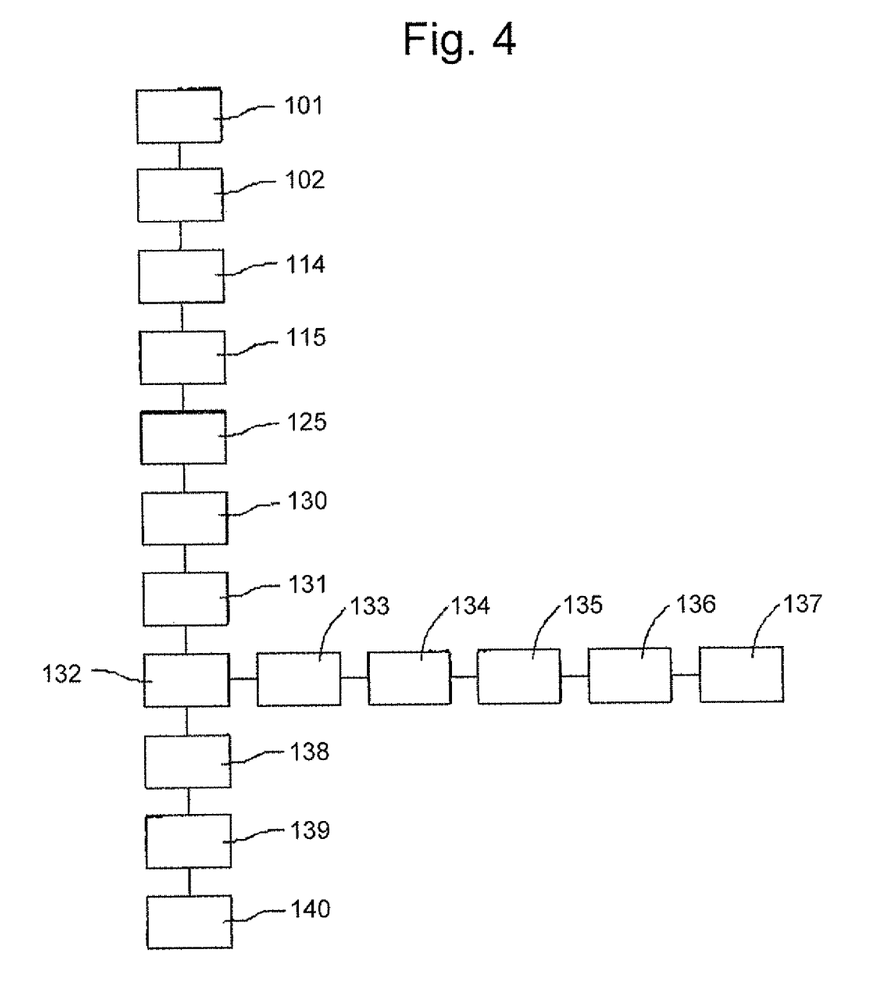
FIG. 4 is an illustration of an embodiment of the processing machine for soybeans and soybean-embryos according to the second aspect of the present invention.
Figure 5:
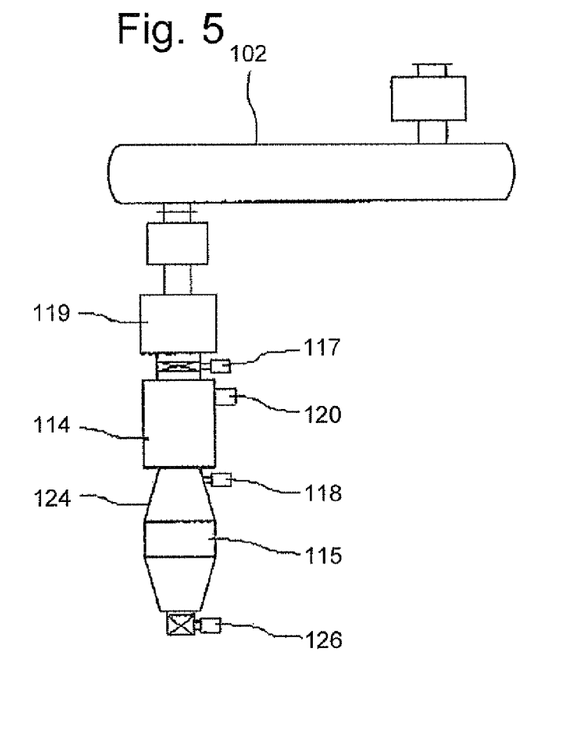
FIG. 5 is a side view of the deactivating and sterilizing apparatus, the tank and the hopper shown in FIG. 4.
Figure 6:
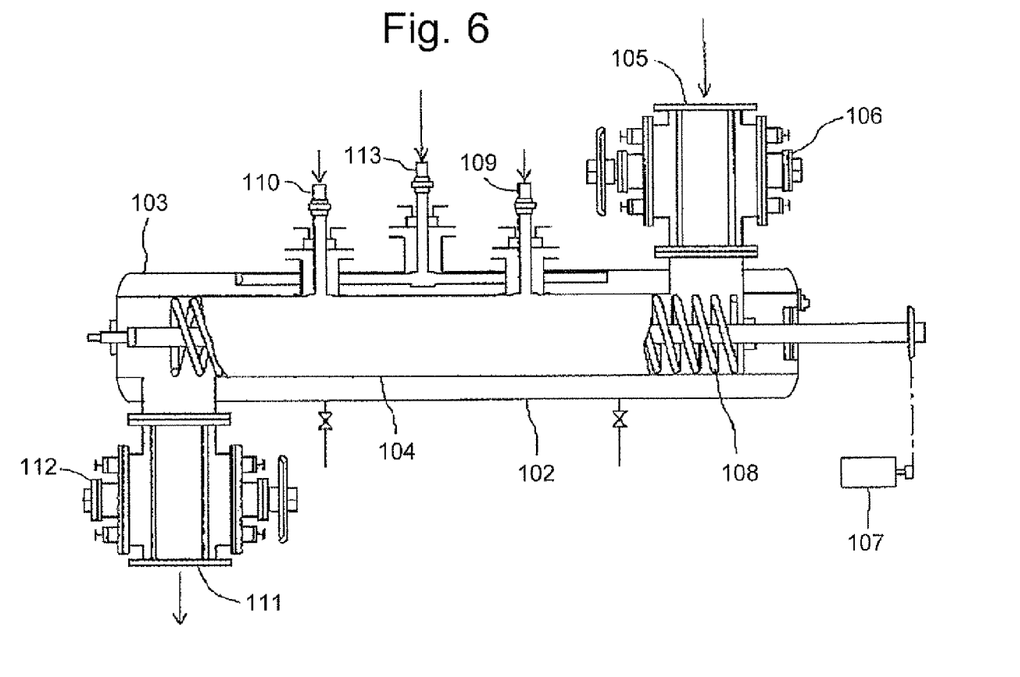
FIG. 6 is a side view of the deactivating and sterilizing apparatus shown in FIG. 5.

FIG. 4 shows a processing machine for soybeans and soybean-embryos according to the second aspect of the present invention. In this system, soybeans are introduced through a hopper 101 into a deactivating and sterilizing apparatus 102. As shown in FIGS. 5 and 6, the deactivating and sterilizing apparatus 102 has an outer tube 103 and inner tube 104, both tubes 103 and 104 horizontally extending in the form of a duplex tube. The soybeans are introduced through the introduction port 105, to be supplied into the inner tube 104. When supplied, the soybeans pass through a rotary valve 106, which intermittently supplies the soybeans at a constant rate. The supplied soybeans are conveyed forward by a feed screw 108, which is rotated by a motor 107.

During this process, steam is injected through the injection ports 109 and 110 into the inner tube 104, whereby the soybeans are deactivated and sterilized. The steam injected in this stage is a superheated steam having a temperature of 150 to 300 degrees Celsius. After this stage, the soybeans are discharged from a discharge port 111. When discharged, the soybeans pass through a rotary valve 112, which intermittently discharges the soybeans at a constant rate. Meanwhile, steam is supplied through an injection port 113 into the space between the outer tube 103 and the inner tube 104, whereby the temperature of the inner tube 104 is maintained. This steam is a superheated steam having a temperature of 100 to 150 degrees Celsius.

Figure 7:
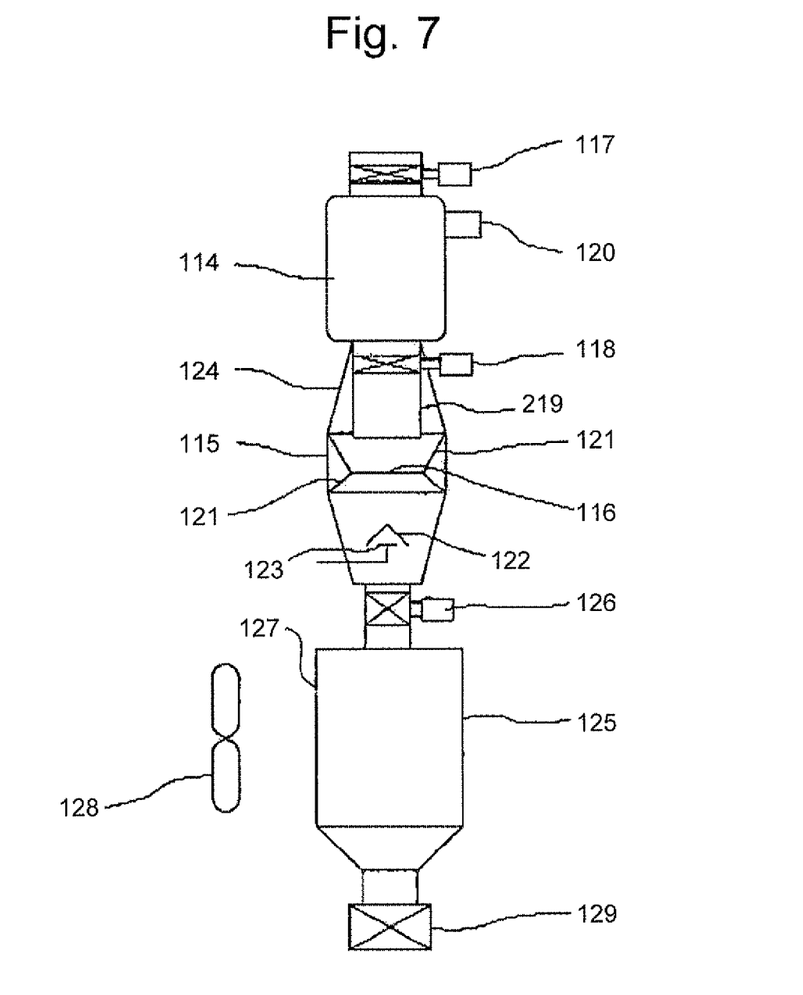
FIG. 7 is a sectional view of the hopper shown in FIG. 5, and an impact plate.

The deactivating and sterilizing apparatus 102 in the present machine is combined with a tank 114, which receives the soybeans that have passed through the deactivating and sterilizing stage. Additionally, as shown in FIG. 7, a hopper 115 and impact plate 116 are provided under the tank 114. The soybeans are powerfully discharged from the tank 114 to collide with the impact plate 116. Consequently, the soybeans are cracked.

As the means for discharging the soybeans, the present machine includes first and second valves 117 and 118 and an internal pressure increasing means. The first valve 117 is located between the deactivating and sterilizing apparatus 102 and the tank 114. In the present embodiment, a tank 119 is provided under the deactivating and sterilizing apparatus 102, and the aforementioned tank 114 is located below this tank 119. The first valve 117 is located between the two tanks 114 and 119. When the soybeans are discharged from the deactivating and sterilizing apparatus 102, the soybeans fall into the tank 119 and are stored in it. That is, the tank 119 functions as a cushion tank. Subsequently, the first valve 117 is opened, whereupon the soybeans fall into the other tank 114 and are to stored in it. The second valve 118 is located between this tank 114 and the impact plate 116, and the internal pressure increasing means is connected to the tank 114. After the soybeans are stored, the first valve 117 is closed to increase the internal pressure of the tank 114 with the internal pressure increasing means. In the present embodiment, steam is injected through an injection port 120 into the tank 114 to increase the internal pressure of the tank 114. The first valve 117 is a butterfly valve and can be automatically opened or closed. The steam is a superheated steam having a temperature of 150 to 200 degrees Celsius. The steam is injected for a period of time within a range from 30 seconds to 3 minutes and 30 seconds, to increase the internal pressure to a range of 0.3 to 0.5 MPa. Thus, the tank 114 functions as a pressure tank.

Subsequently, the second valve 118 is opened, whereupon the soybeans are powerfully discharged due to the internal pressure. In the present embodiment, a pipe 219 is connected to the tank 114, and the second valve 118 is provided in this pipe 219. Within the hopper 115, the pipe 219 vertically extends toward the horizontal impact plate 116, which is fixed to the shaft 121. The second valve 118, which is a butterfly valve, automatically opens when the internal pressure of the tank 114 reaches the range of 0.3 to 0.5 MPa. Then, the soybeans 219 are powerfully discharged through the pipe 219 toward the impact plate 116 and collide with the same plate 116. Consequently, the soybeans are cracked. The cracked soybeans are stored in the hopper 115. Additionally, a cover 122 is provided under the impact plate 116 within the hopper 115, with a nozzle 123 located under the cover 122. This cover 122 is arranged to cover the nozzle 123, from which cold air is ejected. The temperature of this air is 10 to 30 degrees Celsius. The pipe 219 is surrounded by a punched plate 124. The aforementioned cold air flows upwards inside the hopper 115, to be discharged through the punched plate 124 to the outside. Thus, the soybeans are cooled by the cool air.

Additionally, a cooler 125 is provided under the hopper 115, with a rotary valve 126 located between the hopper 115 and the cooler 125. After passing through the cracking stage, the soybeans are introduced through the rotary valve 126 into the cooler 125, by which the soybeans are cooled. The cooler 125 includes a circumferential wall 127 and a suction blower 128, the wall 127 having a mesh structure. The circumferential wall 127 receives the soybeans from above, while cool air is drawn by the suction blower 128 through the circumferential wall 127. The temperature of this air is 10 to 30 degrees Celsius. In this manner, the cool air is supplied onto the soybeans, and the soybeans are cooled by the air current. The cooled soybeans are discharged through the rotary valve 129 to the outside.

The cooler 125 is combined with a dryer 130. The soybeans that have been cracked and cooled are transferred to the dryer 130, which dries the soybeans. Specifically, for example, the dryer 130 supplies a current of hot air to the soybeans inside so as to dry the soybeans with the hot air, while shaking them.

The dryer 130 is combined with a half cutter 131. The dried soybeans are transferred to this half cutter 131, which cuts their skin in half. Specifically, for example, the half cutter 131 has a rotating disk inside, onto which the soybeans are guided. The disk has a large number of pins, which collide with and impact on the soybeans, thereby half-cutting their skin. As a result, the skin is half-removed from each soybean.

The half cutter 131 is combined with an embryo separator 132. After the drying and half-cutting processes, the soybeans are transferred to the embryo separator 132. By the embryo separator 132, albumen, skin and embryos are separated from each other, among which the embryos are separately collected.

The collected embryos are transferred to a sieve 133. This sieve 133 is a multi-stage type having a circular form. In this sieve 133, the embryos are further separated. When collected, the embryos will have a purity level of 20 to 40%.

Subsequently, the embryos are transferred to a cyclone separator 134, which classifies the embryos according to their specific gravity. This process is repeated many times to achieve a purity level of 90 to 97%.

Then, the embryos are transferred to an embryo deactivator 135, by which they are deactivated. The embryo deactivator 135 has a structure similar to that of the deactivating and sterilizing apparatus 102; it has an introduction port, discharge port, feed screw and injection port. The embryos are introduced through the introduction port and then conveyed by the feed screw, while steam is supplied from the injection port to deactivate the embryos with the steam. This steam is a superheated steam having a temperature of 150 to 300 degrees Celsius. The deactivated embryos are discharged from the discharge port.

After the deactivating process, the embryos are transferred to a cooler 136, by which they are cooled. Specifically, for example, a current of cold air having a temperature of 0 to 30 degrees Celsius is supplied onto the embryos to cool them with the cool air.

Subsequently, the embryos are transferred to a crusher 137, by which they are crushed into powder. This powder is collected, to be processed into a product.

Embryos are rich in calcium. Therefore, the collected powder can be used in the production of health food. For example, the powder can be used as an additive to be mixed in foodstuffs, or may be directly ingested.

After the embryos are collected, the soybeans remaining in the present machine are transferred to a crusher, which crushes the soybeans into powder, and this powder is collected.

For example, after the skin of the soybeans is half-removed in the previously described manner, the soybeans are transferred to the crusher 138, by which they are crushed into powder. The crusher 138 is a hammer-type crusher for roughly crushing the soybeans. The grain size of the soybean powder obtained in this stage is within a range from 200 to 2500 μm.

Subsequently, the soybeans are transferred to another crusher 139, by which they are crushed into powder. This crusher 139 is a pulverizer for finely grinding the soybeans. The grain size of the soybean powder obtained in this stage is within a range from 5 to 150 μm.

Subsequently, this powder is transferred to a classifier 140, by which the powder is classified. The resultant fine grains are collected, to be processed into a product, while coarse grains are returned to the crusher 139. The crusher 140 is an air type classifier. The grain size of the classified fine grains is not greater than 5 μm.

Soybeans contain high-quality proteins. Therefore, the collected powder should be preferably used as an additive to be mixed in foodstuffs.

As already explained, the present system initially cracks soybeans and then dries the cracked soybeans with the dryer 130. A cracked soybean has a gap formed between its skin and albumen. Therefore, the soybeans can be effectively dried in the subsequent stage. This drying process requires only a short period of time and hence is highly efficient.

Additionally, the present system cools the cracked soybeans with the cooler 125. The cooling process causes both the skin and albumen to shrink, but their shrinking speeds differ from each other. Consequently, the crack widens, causing the skin and albumen to be separated. This is advantageous in that the soybeans will be effectively dried in the subsequent drying process using the dryer 130.

As already explained, the drying time has been normally as long as 20 hours. By contrast, an experiment of the present system has confirmed that the drying time can be reduced to 60 to 90 minutes.

The separation of the skin and albumen does not only affect the drying time; it also facilitates the process of half-cutting the soybeans with the half cutter 131 after the soybeans are dried.

The invention claimed is:

1. A processing machine for soybeans and soybean-embryos, comprising:
    a tank, which is combined with a deactivating and sterilizing apparatus for deactivating and sterilizing soybeans by steam and is arranged to store the soybeans after the deactivating and sterilizing process;
    an impact plate provided under the tank;
    a discharge means for powerfully discharging the soybeans from the tank to make the soybeans collide with the impact plate and thereby crack the soybeans; and
    a dryer for drying the cracked soybeans.

2. The processing machine for soybeans and soybean-embryos according to claim 1, wherein:
    the discharge means includes a first valve, a second valve and an internal pressure increasing means;
    the first valve is provided between the deactivating and sterilizing apparatus and the tank;
    the second valve is provided between the tank and the impact plate;
    the internal pressure increasing means is connected to the tank; and
    after the soybeans are stored, the first valve is capable of being closed so that an internal pressure of the tank is increased by the inner pressure increasing means, and subsequently, the second valve is capable of being opened, whereupon the internal pressure is capable of powerfully discharging the soybeans.

3. The processing machine for soybeans and soybean-embryos according to claim 2, wherein the internal pressure increasing means injects steam into the tank to increase the internal pressure of the tank by the steam.

4. The processing machine for soybeans and soybean-embryos according to claim 1, further comprising:
    a cooler that is configured to cool the soybeans after the soybeans are cracked and before the soybeans are dried by the dryer.

5. The processing machine for soybeans and soybean-embryos according to claim 1, further comprising:
    an embryo separator configured to separate embryos from the dried soybeans and to collect the embryos;
    an embryo deactivator for deactivating the collected embryos; and
    a first crusher for crushing the deactivated embryos into powder and collecting the powder.

6. The processing machine for soybeans and soybean-embryos according to claim 5, wherein the embryo deactivator deactivates the embryos by steam.

7. The processing machine for soybeans and soybean-embryos according to claim 5, further comprising a second crusher, which includes a hammer-type crusher for rough crushing and a pulverizer for fine grinding, for crushing remaining soybeans into powders after the embryos are collected, and for collecting the powder.

* * * * *